(12) United States Patent
McKay

(10) Patent No.: US 6,568,711 B2
(45) Date of Patent: May 27, 2003

(54) SELF GAPPING SOCKET WELD FITTINGS

(75) Inventor: Albert A. McKay, Stoney Creek (CA)

(73) Assignee: Westinghouse Air Brake Co, Wilmerding, PA (US)

( * ) Notice: Subject to any disclaimer, the term of this patent is extended or adjusted under 35 U.S.C. 154(b) by 0 days.

(21) Appl. No.: 09/505,597

(22) Filed: Feb. 16, 2000

(65) Prior Publication Data
US 2002/0008383 A1 Jan. 24, 2002

(51) Int. Cl.$^7$ .................................................. F16L 13/04
(52) U.S. Cl. .................... 285/22; 285/93; 285/288.1; 285/288.8
(58) Field of Search ...................... 285/22, 93, 288.1, 285/288.8, 289.1, 289.3; 228/101

(56) References Cited

U.S. PATENT DOCUMENTS

| | | | | |
|---|---|---|---|---|
| 332,754 A | * | 12/1885 | Scott | 285/289.1 |
| 519,372 A | * | 5/1894 | Young | 285/289.1 |
| 1,903,315 A | * | 4/1933 | Priebe | 285/22 |
| 1,931,666 A | * | 10/1933 | Lindquist | 285/289.3 |
| 2,208,821 A | * | 7/1940 | Taylor | 285/288.1 |
| 2,324,335 A | * | 7/1943 | Taylor | 285/22 |
| 2,423,848 A | * | 7/1947 | O'Conner | 285/22 |
| 3,957,289 A | * | 5/1976 | Kilgore et al. | 285/22 |
| 4,135,740 A | * | 1/1979 | Watson, Jr. | 285/22 |
| 4,256,333 A | * | 3/1981 | Jones | 285/22 |
| 4,346,918 A | * | 8/1982 | Lycan | 285/22 |
| 4,505,420 A | * | 3/1985 | Wittenbach | 285/22 |
| 5,251,714 A | * | 10/1993 | Murofushi | 285/22 |
| 5,380,048 A | * | 1/1995 | Vogel | 285/289.1 |
| 5,507,528 A | * | 4/1996 | Mastrosimone | 285/22 |

FOREIGN PATENT DOCUMENTS

| | | | | |
|---|---|---|---|---|
| GB | 3513 | * | of 1894 | 285/22 |
| GB | 25181 | * | of 1895 | 285/22 |
| GB | 496396 | * | 11/1938 | 285/22 |

* cited by examiner

Primary Examiner—Eric K. Nicholson
(74) Attorney, Agent, or Firm—James Ray & Associates

(57) ABSTRACT

The present invention provides a positive gapping device for socket welded fittings. The positive gapping device comprises a socket fitting having a recessed area on at least one end for receiving a pipe section that is engageable with the recessed area of the socket fitting. It further includes a gapping means disposed on one of a surface of the recessed area of the socket fitting facing an end of such pipe section and an end of such pipe section for engagement with such socket fitting. The gapping means providing a space between the socket fitting and such pipe section for reducing residual stresses that result from a welding operation.

17 Claims, 2 Drawing Sheets

SELF GAPPING SOCKET WELD FITTINGS

FIELD OF THE INVENTION

The present invention relates, in general, to socket welded fittings and, more particularly, the present invention relates to a positive gapping device for socket welded fittings.

BACKGROUND OF THE INVENTION

It is generally well known throughout the industry that if a pipe section is placed in a socket tightly against the shoulder during a welding operation that residual stresses are produced due to the heating and cooling of the weld joint. To eliminate this problem a gap is typically specified in order to provide a space between the socket shoulder and the end of the pipe section so as to eliminate this problem by providing room for expansion.

In order to ensure that this gap truly does exist, a washer with axial movement has been developed and has been used in the industry. Although to some extent the washer does solve the gapping problem, several other additional problems are also present and continue to exist with this type of washer system. First, there is the additional cost that is related to the manufacturing of the extra component that is needed in this system. Further, there is no way to ensure that this washer, or that such gap, was indeed in place prior to welding because after the fittings are welded together it is too late. Unless the presence of the washer is noted and identified before the welding operation, after the weld is completed there is no way of going back and checking.

Once the welding operation is completed there is no visual indication as to whether a spacer was used or not. Thus, there is no guarantee that a gap was indeed present. The gap is necessary to relieve the compressive stresses on the pipe that are produced during welding and which result in tensile stresses on the weld during service. These stresses result in lower weld life.

SUMMARY OF THE INVENTION

The present invention provides a positive gapping device for socket welded fittings. The positive gapping device comprises a socket fitting having at least one recessed area for receiving a pipe section that is engageable with the recessed area of the socket fitting. It further includes a gapping means disposed on one of a surface of the recessed area of the socket fitting facing an end of such pipe section and an end of such pipe section for engagement with such socket fitting. The gapping means providing a space between the socket fitting and such pipe section for reducing residual stresses that result from a welding operation.

Another embodiment of the invention provides a positive gapping device for socket welded fittings wherein an identification means is provided on an exterior surface on one of the socket fitting and such pipe section for identifying one of the socket fitting and such pipe section as having a proper gapping means disposed therein.

OBJECTS OF THE INVENTION

It is, therefore, one of the primary objectives of the present invention to provide a gapping means for socket welded fittings.

It is also an object of the present invention to provide a failsafe positive gapping means.

Additionally, it is an object of the present invention to provide a visual indication of a properly prepared socket weld fitting that is evident after the weld is completed.

Further, it is an object of the present invention to provide a gap that is machined into the fitting without the need for an additional component.

Yet, still another object of the present invention is to provide a gapping means that is relatively inexpensive to manufacture.

These and other objects and advantages of this invention will become apparent after a full reading of the following detailed description, particularly, when read in conjunction with the attached drawings as described below and the appended claims.

Figure 1:
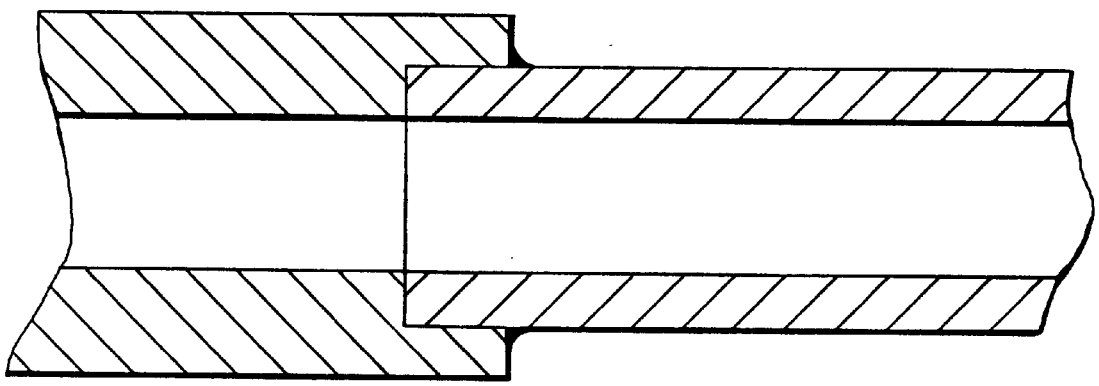
FIG. 1 is a drawing of a prior art socket weld fitting showing a fitting with a zero gap.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

Figure 2:
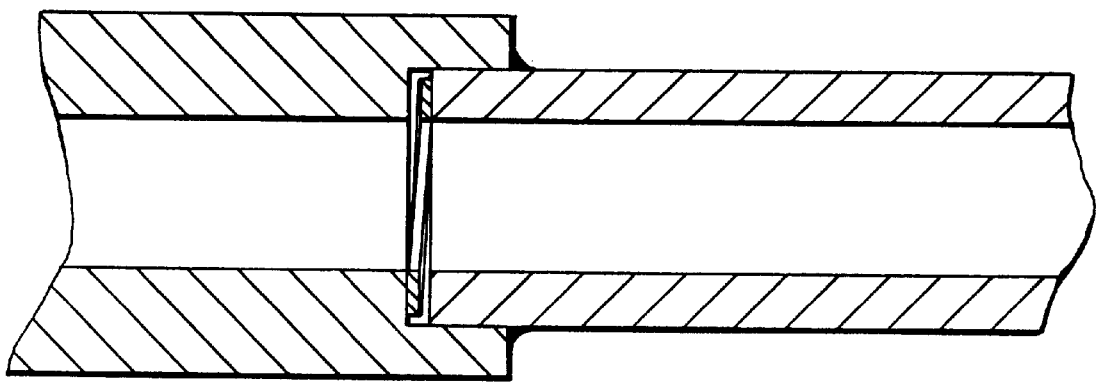
FIG. 2 is a drawing of a prior art socket weld fitting showing a gap created by a wave washer.

Illustrated in FIGS. 1 and 2 are drawings of prior art socket weld fittings that depict problems that are related to these weld fittings. In FIG. 1 there is a zero gap where a pipe is placed in the socket tight against the shoulder. This results in compressive stresses on the pipe and tensile stresses on the weld in service. The tensile stresses result in a lower life for the weld.

FIG. 2 shows a prior art solution to the gap problem. In this prior art invention a wave washer is used to provide the gap and alleviate the stress problem. This modification ensures a gap at the socket-pipe interface. However, this presents a cost increase for the additional part and, further, it is necessary to ensure that the washer is present before welding because after the weld is complete there is no way to ascertain that a spacer was used.

Figure 3:
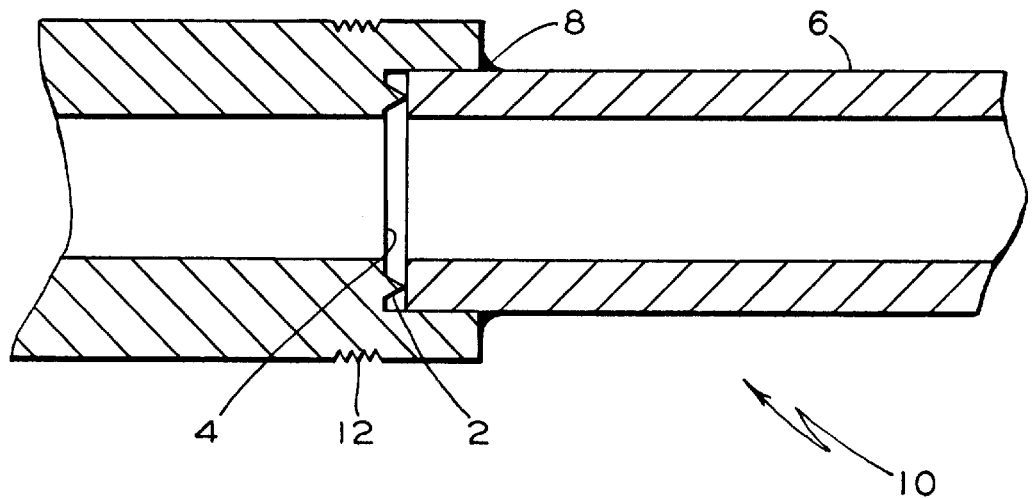
FIG. 3 is a drawing of a socket weld fitting assembly and a pipe section disposed therein according to a first embodiment of the invention.

Illustrated in FIG. 3 is a socket weld fitting assembly, generally designated 10, according to an first embodiment of the present invention. Such socket fitting assembly 10 has at least one recessed area for receiving a pipe section 6 prior to a welding operation. Socket fitting assembly 10 is provided with a gapping means 2 on a face portion 4 of the recessed area of the socket fitting assembly 10. Such face portion 4 faces an end of such pipe section 6. In a presently preferred embodiment of the invention such gapping means 2 is machined into the exterior of face surface 4 of such socket fitting assembly 10.

Such gapping means 2 may be a projection such as a crush ring, a face knurl or any other means to provide a gap between such socket fitting assembly 10 and such pipe section 6 for reducing residual stresses that are produced from a welding operation. In a presently preferred embodiment of the invention such gapping means 2 is a projection.

Figure 4:
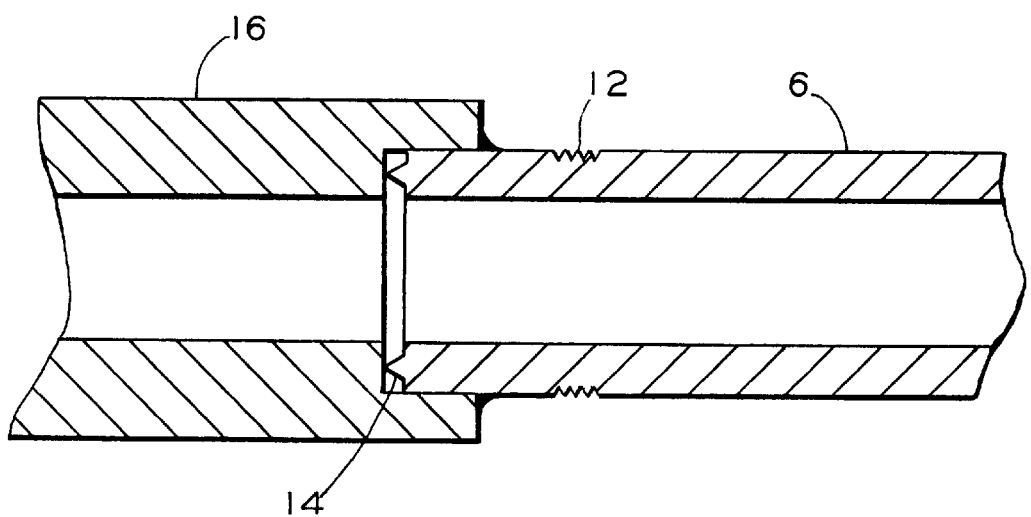
FIG. 4 is a drawing of a socket welded fitting assembly and a pipe section disposed therein according to an alternate embodiment of the invention.

Illustrated in FIG. 4 is an alternate embodiment of the invention. In this alternate embodiment of the invention there is provided a gapping means 14 on the end of pipe section 6. Such gapping means 14 may be a projection such as a crush ring, a face knurl or any other means to provide a gap between such pipe section 6 and socket fitting 16 for reducing residual stresses that are produced from a welding operation. It is presently preferred that such gapping means 14 be a projection.

The drawings in FIGS. 3 and 4 shows the projection 2 and 14 to be somewhat larger that they really are, relative to the size of the fittings, for clarity.

The pipe section 6 is placed in the recessed area provided on the end of the socket fitting assembly 10. Pipe section 6 is placed up tight against the projection 2. Similarly, when the projection 14 is provided on the end of pipe section 6 the projection 14 is placed up tight against the face of the recessed portion of socket fitting 16. The projection 2 or 14 provides the gap that is necessary when the welding operation is performed on the exterior portion 8 of such socket fitting 10 and such pipe section 6. The space afforded by the projection 2 or 14 is provided so that when the pipe section 6 expands due to the heat of the welding operation, the crush zone, that is the area encompassing the projection, is reduced. Thus, the projection 2 or 14, provides an area for expansion of the pipe section against the socket fitting.

The expansion area that is provided by the gapping means is designed to reduce the residual stresses that are produced during the heating and cooling of such welding operation. Such residual stresses reduce the life of a weld.

In a presently preferred embodiment of the invention such crush zone is provided by a projection 2. However, as discussed previously it is within the realm of the invention that such crush zone be provided by a knurl on the face of the socket fitting assembly 10, or by other means for providing a controlled projection on the face of the socket fitting assembly 10. However, it is very important that such gapping means, be it a ring or a knurl or whatever, will give under a load.

In another embodiment of the invention there is provided an identification means 12 on the exterior surface of one of the socket fitting assembly 10 near the recessed area and on such pipe section 6 near the end of the pipe section. Such identification means 12 is designed to identify a socket fitting assembly 10 or a pipe section 6 on which was disposed a proper gapping means 2 or 14. The gapping means 2 provided on the face 4 of the socket fitting assembly 10 or the end of pipe section 6 can then be identified by a simple visual inspection. Such identification means is still available after the weld is completed.

It is presently preferred that such identification means 12 be a profile either stamped or machined onto the outside surface of one of the socket fitting assembly 10 and the pipe section 6. It is also presently preferred that such identification means 12 be a stamped profile. Such an identification means 12 gives a positive indication that such a socket fitting assembly 10 or such pipe section 6 did indeed have a projection 2 or 14, or was a provided with a crush zone. Such a stamped profile or a machined profile remains on the exterior surface of the socket fitting assembly 10 or the pipe section 6 after the weld is completed. Thus, the identification means 12, such as the stamped profile, identifies a properly prepared socket fitting assembly by a simple visual identification mark on the exterior of the socket fitting or the pipe section.

While both the presently preferred and a number of alternative embodiments of the present invention have been described in detail above it is understood that various other adaptations and modifications of the present invention can be envisioned by those persons who are skilled in the relevant art without departing from either the spirit of the invention or the scope of the appended claims.

I claim:

1. A positive gapping device for socket welded fittings, said positive gapping device comprising:
    (a) a socket fitting having at least one recessed area for receiving a pipe section engageable with said recessed area of said socket fitting, said recessed area including a ledge portion; and
    (b) a gapping means integrally formed as a single piece on one of a surface of said ledge portion of said recessed area of said socket fitting facing an end of said pipe section and said end of said pipe section facing said ledge portion of said recessed area of said socket fitting for providing a space between said socket fitting and said pipe section to reduce residual stresses resulting from a welding operation, wherein at least one of said socket fitting and said pipe section further includes an identification means on an exterior surface of said one of said socket fitting and said pipe section for identifying one of said socket fitting and said pipe section as having a proper gapping means disposed therein, said identification means is one of a stamped profile and a machined profile.

2. A positive gapping device for socket welded fittings, according to claim 1, wherein said gapping means is provided on said socket fitting.

3. A positive gapping device for socket welded fittings, according to claim 2, wherein said gapping means is machined into said socket fitting.

4. A positive gapping device for socket welded fittings, according to claim 2, wherein said gapping means is one of a projection and a knurled face.

5. A positive gapping device for socket welded fittings, according to claim 4, wherein said gapping means is a projection.

6. A positive gapping device for socket welded fittings, according to claim 2, wherein said identification means is disposed on said socket fitting as a stamped profile.

7. A positive gapping device for socket welded fittings, according to claim 1, wherein gapping means is disposed on said end of said pipe section.

8. A positive gapping device for socket welded fittings, according to claim 7, wherein said gapping means is machined into said end of said pipe section.

9. A positive gapping device for socket welded fittings, according to claim 7, wherein said gapping means is one of a projection and a knurled face.

10. A positive gapping device for socket welded fittings, according to claim 9, wherein said gapping means is a projection.

11. A positive gapping device for socket welded fittings, according to claim 7, wherein said pipe section further includes an identification means on an exterior surface of said pipe section for identifying said pipe section as having a proper gapping means disposed thereon.

12. A positive gapping device for socket welded fittings, according to claim 11, wherein said identification means is one of a stamped profile and a machined profile.

13. A positive gapping device for socket welded fittings, according to claim 12, wherein said identification means is a stamped profile.

14. A positive gapping device for socket welded fittings, said positive gapping device comprising:
    (a) a socket fitting having at least one recessed area for receiving a pipe section engageable with said recessed area of said socket fitting, said recessed area including a ledge portion; and (b) a gapping means integrally formed as a single piece on said ledge portion of said recessed area of said socket fitting facing an end of said pipe section for providing a space between said socket fitting and said pipe section to reduce residual stresses resulting from a welding operation, wherein said socket fitting further includes an identification means on an exterior surface of said socket fitting for identifying said socket fitting as having a proper gapping means disposed therein, said identification means is one of a stamped profile and a machined profile.

15. A positive gapping device for socket welded fittings, according to claim 14, wherein said gapping means is one of a projection and a knurled face.

16. A positive gapping device for socket welded fittings, said positive gapping device comprising:

(a) a socket fitting having at least one recessed area for receiving a pipe section engageable with said recessed area of said socket fitting, said recessed area including a ledge portion; and (b) a gapping means integrally formed as a single piece on said end of said pipe section facing said ledge portion of said recessed area of said socket fitting for providing a space between said socket fitting and said pipe section to reduce residual stresses resulting from a welding operation, wherein said pipe section further includes an identification means on an exterior surface of said pipe section for identifying said pipe section as having a proper gapping means disposed thereon, said identification means is one of a stamped profile and a machined profile.

17. A positive gapping device for socket welded fittings, according to claim 16, wherein said identification means is disposed on said pipe section as a stamped profile.

* * * * *